No. 641,345. Patented Jan. 16, 1900.
C. A. G. STORZ.
BACK PRESSURE VALVE.
(Application filed Dec. 12, 1898.)
(No Model.)
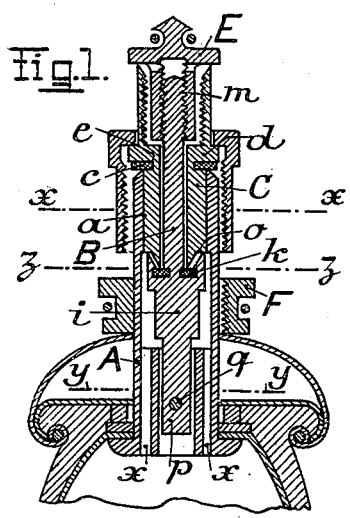
Fig. 1.
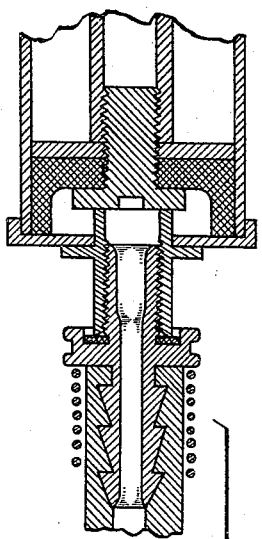
Fig. 3.
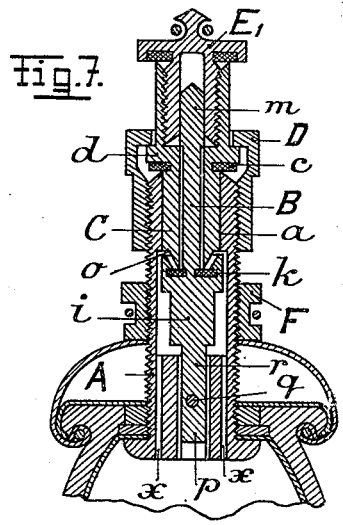
Fig. 7.
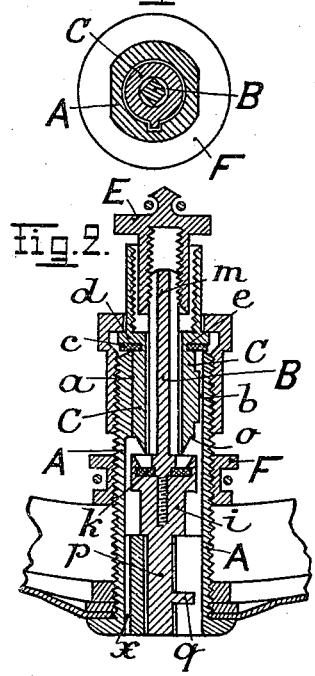
Fig. 2. Fig. 4.
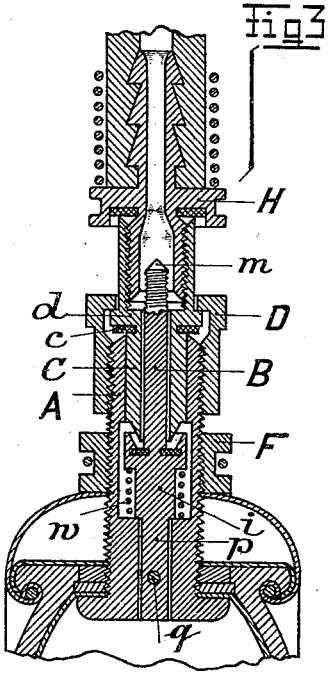
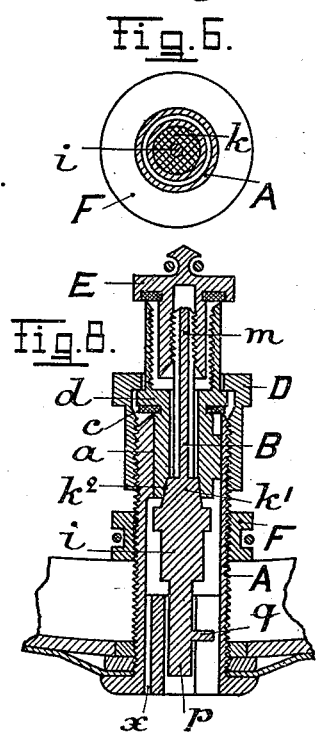
Fig. 6. Fig. 8.
WITNESSES:
Ella L Giles
Fig. 5.
INVENTOR:
Carl August Guido Storz
by Richardson
ATTORNEYS
THE NORRIS PETERS CO., PHOTO-LITHO., WASHINGTON, D. C.

UNITED STATES PATENT OFFICE.

CARL AUGUST GUIDO STORZ, OF FRANKFORT-ON-THE-MAIN, GERMANY.

BACK-PRESSURE VALVE.

SPECIFICATION forming part of Letters Patent No. 641,345, dated January 16, 1900.

Application filed December 12, 1898. Serial No. 699,048. (No model.)

*To all whom it may concern:*

Be it known that I, CARL AUGUST GUIDO STORZ, a subject of the German Emperor, residing at Frankfort-on-the-Main, German Empire, have invented certain new and useful Improvements in Back-Pressure Valves; and I do hereby declare the following to be a full, clear, and exact description of the invention, such as will enable others skilled in the art to which it appertains to make and use the same.

This invention relates to a back-pressure valve which is more particularly suitable for use in pneumatic tires.

The object of the invention consists in the construction of such a valve that while fully tight and of the smallest possible length and diameter it may easily and with certainty spring up, and thus afford a convenient and easy inflation of the tires and the like.

In the accompanying drawings, Figure 1 is a longitudinal section of a form of construction of the back-pressure valve when closed; Fig. 2, a longitudinal section of the same when opened; Fig. 3, a longitudinal section showing the attachment to the tire and the air-pump; Fig. 4, a cross-section on the line $x\,x$ of Fig. 1; Fig. 5, a cross-section on the line $y\,y$ of Fig. 1; Fig. 6, a cross-section on the line $z\,z$ of Fig. 1; Fig. 7, a longitudinal section of a modification of form; Fig. 8, another modification.

The valve consists, essentially, of a casing A, which is screwed firmly by means of a nut F onto the rim of the wheel, a valve-spindle B, and a valve-head C, inserted in the casing and screwed tight by means of a nut D.

In the construction of a thoroughly-tight back-pressure valve without the necessity of cementing on care must be taken, in order that it may be used for wheel-tires, to have a short length of build and as small a diameter as possible while still allowing a sufficiently large passage for the air. In order to attain this object, the valve-casing A is provided in its upper part with a thickening of the wall extending toward the interior, while beneath the same, in consequence of the smaller thickness of the wall of the inner chamber of the casing, there is a widened part. By this means the result is attained that the valve-head C may be provided with a key or spline to engage in a groove $b$ in the internal face of the thickened wall $a$ of the casing to prevent it turning, Figs. 2 and 4, without necessitating the same being carried to the outside. Consequently the necessary tightness may be obtained between the valve-casing and valve-head, together with the valve-head stopping-groove directly on the upper part of the valve-casing, in contrast to the forms of construction hitherto employed having grooves entirely penetrating the valve-casing, in which the stuffing-box could only find a place beneath the stop-groove. Consequently the length of build of this improved valve as against the ones at present employed with valve-head stop arrangement is less by the length of the stop-groove and also the width of the stuffing-box cone or support. This diminution of the length of the valve is of importance, inasmuch as experience has shown that leakages mainly take place at the point of connection between the air-tube and the valve-casing by the dragging of the casing when inflating the tire. It is evident that this drawback will become more apparent the greater the leverage on which the dragging takes place—that is to say, the greater the length of the valve. Consequently the shortening of the length of the valve is a considerable improvement.

The valve-head C, inserted in the valve-casing, rests on the upper edge of the casing by means of a flange $d$, an india-rubber washer-ring $c$ being placed between them, which is sprung into a groove $e$, turned in the valve-head. By tightening the nut D the valve-head, including the stop-groove, is entirely washered by means of the washer-ring $c$.

In order to obtain as large a valve-body as possible with the object of producing a durable and solidly-mounted valve-joint and to yet have an outside diameter of the valve-casing amounting as a maximum only to 8.8 millimeters, and also to create sufficient room for obtaining a suitable air-passage in the valve, the part of the valve-casing surrounding the valve-body and lying under the thickened part $a$ of the valve-casing is provided with a widened part or has the inner wall turned out more fully, which arrangement forms a further characteristic of the construction of the valve-casing of this improved valve, as none of the tire-valves hitherto known has a valve-body of so great a diameter which is located in the central part of the casing, and this is of advantage for the reason that a diminution of the valve-spindle, which is usually only 5.9 millimeters in thickness, is not possible without affecting the solid mounting and perfect joint of the valve. Vice versa, any increase of the outside diameter of the valve-casing, which usually amounts to 8.8 millimeters, is also inadmissible.

Now in order to washer or make a tight joint for the valve-spindle in the present improved valve in such a way that without producing difficulties in the manufacture it may easily and certainly spring up when inflated and yet afford a complete joint the actual body $i$ of the spindle is first made as large as possible and provided with an india-rubber washer-ring $k$, which both on its inner and outer edge is sprung into grooves in the valve-spindle and in the valve-body $i$, which washer-ring presses against the sharp lower edge of the valve-head upon the valve closing. In consequence of this arrangement any lateral extension and squeezing out of the washer-ring is avoided, and yet in consequence of the sharp-edged valve-seat a thoroughly tight joint is obtained, which on the other hand excludes the necessity of any cementing.

In order to prevent any tearing of the washer-ring by the sharp edges of the valve-seat, the valve-body $i$ has an annular excrescence surrounding the india-rubber ring, which after the closing of the valve encounters the shoulder $o$, Figs. 1 and 2, of the valve-head, and thereby prevents the pressure of the washer-ring exceeding a certain amount—say, about half a millimeter. As the india-rubber ring cannot come out sidewise, any stoppage of the air-passage, as well as any tearing out and remaining suspended of the washer-ring, is avoided, and therefore its durability is considerably increased.

It has been found in the form of construction hereinbefore described that in spite of the limitation of the pressure to the upper surface of the india-rubber washer-ring cracks resulting thereon affect a hermetic closing when there is a slight excess pressure in the valve when the valve-spindle is not held in an immovable position to the valve-head and always assumes this same equal position. In order to effect this, the valve-head and the valve-casing have only a single stop-groove, so that the valve-head always assumes the same position. The lower part $p$ of the valve-spindle also has only a single stop-pin $q$, which engages in a groove $r$ of the under part of the valve-casing or valve-support nozzle, the under part $p$ of the said valve-spindle resting in the present construction of the valve directly on the under part of the casing or support. Consequently the valve-spindle and valve-head must always assume the same relative position apart from the longitudinal movement.

The valve-spindle may, as shown in Fig. 2, be made of two parts screwed together, thus increasing the facility of manufacture. If the inner groove for the india-rubber ring $k$ be made somewhat lower than the outer groove, the inner surface of the washer-ring when the valve-spindle parts are screwed together undergoes pressure and is thus especially held firmly at this place also.

The air-passage in the present valve is produced by the upper part $m$ of the valve-spindle which passes through the bore of the valve-head being made angular and not round like the bore, so that the air can play around the spindle. The necessary space for play around the valve-head for the passage of the air is created by a widened or considerably-turned-out part formed in the casing at this place and in the central part of the valve-casing, while the connection for the air between this chamber and the hollow part of the pneumatic tire may be made by means of passages $x$, formed between the outside of the valve-casing and the internal or centrally-perforated wall of the valve-casing support. For the purpose of more easily forming these air-passages $x$ and the groove $r$ without stopping the valve-spindle in the upper part of the valve-casing the latter is formed in two parts, and the inner part or support $p$ of the stem is driven in separately.

The valve-spindle is threaded on the edges of its upper part to allow of the screwing on a cap E, Figs. 1 and 2, so that the closed valve may be firmly pressed on its seat not only by the internal pressure, but also by the screwing on of the cap, so that any unintentional opening is prevented. When examining a loose air-tube as regards tightness, as the same will not bear more than one-third of an atmosphere of pressure and as therefore the small superficial contents of the valve-seat can only spring into action on the valve with about five grams of superpressure, it will be apparent that when the cap is screwed on the valve-spindle may be easily pushed back, and consequently an unintentional opening may take place. In order to avoid this, before the pneumatic tire is examined a spiral spring $w$, Fig. 3, is placed on the valve-spindle to press the valve on its seat. The mounting of this spring takes place by a simple insertion or screwing in of the same up to the stop-pins $q$, which secure the valve-spindle of this valve against rotation and also protect the spiral spring from dropping out. In ordinary use, however, the protecting-spring arranged, as hereinbefore explained, for screwing in and out, which arrangement is equally new in such valves, may be omitted as superfluous, because then the internal pressure is alone sufficient to prevent an unintentional opening of the valve.

As may be seen in Fig. 7, the cap E may be also so arranged that it does not separately press on the valve, but is screwed with an external thread in the internal thread of the upper part of the valve-head. In this case a special washer E' is, however, necessary on the cap.

As may be seen in Fig. 8, the washering of the valve-spindle may also be effected simply by a metal cone $k'$, which fits into the tapering end $k^2$ of the bore of the valve-head; but this washering is only sufficient under certain circumstances in practical working, and the washering or joint shown in Figs. 1, 2, 3, and 7 is preferable. A very solid joint is also afforded to the inflating-pipe to be employed with the present valve, Fig. 3, which pipe for this object has an external thread with which it is screwed into the internal thread of the upper part of the valve-head, which in turn presses with its tapering edge against the washer-ring inserted in the recess of the flange H of the inflating-tube in order to increase the durability. Of course the valve-head upper part may also be provided with an external screw for the purpose of employing an inflating-tube provided with an internal thread in order to allow of the inflating-tubes intended for use with Dunlop valves to be employed. A separate attachment-piece may also be arranged for the valve-head upper part and provided with an internal thread and added to the valve, which attachment-piece renders possible the use with the present valve of the inflating-pipe nozzle intended for the Dunlop valve. It is preferable, however, to employ the attachment shown in Fig. 3, because the outer valve-threaded attachment does not allow a large and free discharge to the tube-nozzle, and the leather disk passages easily or rapidly become stopped and render more difficult the inflation of the tires.

The present valve in addition to being employed for the purpose of tire-valves may also be employed for charging and increasing the pressure of air and other gases in containers.

Having now particularly described and ascertained the nature of this invention and in what manner the same is to be performed, I declare that what I claim is—

1. In an exteriorly-accessible air-valve for bicycle-tires and the like, the combination with the valve-box having a thickened wall at the upper end thereof provided with a longitudinal groove, of a valve head or seat having a tongue or projection entering said groove, and a valve coöperating with said head, substantially as described.

2. In an exteriorly-accessible air-valve for bicycle-tires and the like, the combination with the valve box or casing having a thickened wall at the upper part and an enlarged space directly under the same, of a valve head or seat located in said upper portion and a valve located in said enlarged portion and coacting with said valve head or seat, substantially as described.

3. In combination, the valve box or casing, the valve head or seat located in the upper portion thereof and having an annular sharpened lower edge, the valve located in the lower portion, and the annular washer carried by said valve and having both its inner and outer edges held by said valve, substantially as described.

4. In combination, the valve box or casing, the valve head or seat located in the upper portion and having a single tongue or projection engaging a groove in the valve-casing and a valve located in the lower part and having a single projection engaging a groove in the lower part, substantially as described.

5. In combination, the valve-box having a thickened upper wall and enlarged space just below and a thickened bottom portion forming a shoulder or stop below said enlarged space, a valve-seat in said upper portion, a valve in said enlarged space coacting with said seat and arrested by said stop and having a shank extending down into said lower portion, and a spline connection between said stem and lower portion, substantially as described.

In witness whereof I have hereunto set my hand in presence of two witnesses.

CARL AUGUST GUIDO STORZ.

Witnesses:
 DEAN B. MASON,
 FRANK H. MASON.